(12) United States Patent
Hiertz et al.

(10) Patent No.: US 9,668,143 B2
(45) Date of Patent: May 30, 2017

(54) RADIO DEVICES AND METHODS FOR PERFORMING COMMUNICATION VIA LICENSED AND UNLICENSED SPECTRUM

(71) Applicant: Telefonaktiebolaget L M Ericsson (publ), Stockholm (SE)

(72) Inventors: Guido Hiertz, Aachen (DE); Jung-Fu Cheng, Fremont, CA (US); Anders Furuskär, Stockholm (SE); Havish Koorapaty, Saratoga, CA (US); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 87 days.

(21) Appl. No.: 14/432,783

(22) PCT Filed: May 23, 2014

(86) PCT No.: PCT/SE2014/050640
§ 371 (c)(1),
(2) Date: Apr. 1, 2015

(87) PCT Pub. No.: WO2015/178816
PCT Pub. Date: Nov. 26, 2015

(65) Prior Publication Data
US 2016/0262023 A1    Sep. 8, 2016

(51) Int. Cl.
*H04W 4/00* (2009.01)
*H04W 16/14* (2009.01)
(Continued)

(52) U.S. Cl.
CPC ............. *H04W 16/14* (2013.01); *H04L 5/001* (2013.01); *H04L 5/0048* (2013.01);
(Continued)

(58) Field of Classification Search
CPC .. H04W 16/14; H04W 72/042; H04L 5/0048; H04L 27/2601; H04L 5/001; H04L 27/0006; H04L 72/042; H04L 74/006
See application file for complete search history.

(56) References Cited

U.S. PATENT DOCUMENTS

| | | | |
|---|---|---|---|
| 2013/0203429 A1* | 8/2013 | Kneckt | H04W 74/0816 455/450 |
| 2014/0335876 A1* | 11/2014 | Ratasuk | H04W 16/14 455/450 |

(Continued)

FOREIGN PATENT DOCUMENTS

| | | |
|---|---|---|
| EP | 2696530 A2 | 2/2014 |
| WO | 2012049533 A1 | 4/2012 |

OTHER PUBLICATIONS

Marias, G., et al.. "A Distributed Dynamic Channel reservation Framework for Wireless ATM LANs", Proceedings of 2000 International Zurich Seminar on Broadband Communications, Feb. 15, 2000, pp. 119-125, IEEE.

*Primary Examiner* — Abdelnabi O Musa
(74) *Attorney, Agent, or Firm* — Coats and Bennett, PLLC

(57) ABSTRACT

A first and a second radio communication device and a respective method performed thereby for communicating between the first and the second radio communication device are provided. The method in the first radio communication device comprises transmitting (210), on an unlicensed frequency band, to at least the second radio communication device, an indication of a duration of a guard period, wherein an upcoming data transmission is to be performed to the second radio communication device after the expiration of the guard period. The method further comprises during the guard period, sending and/or receiving (220) information to/from at least one other radio communication (Continued)

device, the other communication device being the second radio communication device or a third communication device.

30 Claims, 13 Drawing Sheets

(51) Int. Cl.
*H04L 5/00* (2006.01)
*H04L 27/00* (2006.01)
*H04W 74/00* (2009.01)
*H04L 27/26* (2006.01)
*H04W 72/04* (2009.01)

(52) U.S. Cl.
CPC ...... *H04L 27/0006* (2013.01); *H04L 27/2601* (2013.01); *H04W 72/042* (2013.01); *H04W 74/006* (2013.01)

(56) References Cited

U.S. PATENT DOCUMENTS

2014/0341135 A1* 11/2014 Bhushan ............... H04L 5/1469
 370/329
2015/0223075 A1* 8/2015 Bashar .................. H04W 16/14
 370/329

* cited by examiner

RADIO DEVICES AND METHODS FOR PERFORMING COMMUNICATION VIA LICENSED AND UNLICENSED SPECTRUM

TECHNICAL FIELD

The present disclosure relates to radio communication and in particular to radio communication between a first and a second radio communication device.

BACKGROUND

The amount of traffic over radio communication networks are more or less constantly increasing. New services are developed and users tend to be online using different communication devices, for examples smartphones and tablets. More and more data is being transmitted over the radio communication networks as well. This puts increasing demands on the existing radio networks, which have finite amount of resources. Different radio networks use different technologies, e.g. Long Term Evolution, LTE, Universal Mobile Telecommunications System, UMTS, and Global System for Mobile communication, GSM. However, common for all are that they operate on so called licensed frequency bands. One operator may have an own part of the whole licensed frequency band or share a part of the whole licensed frequency band with at least one other operator.

LTE uses Orthogonal Frequency Divisional Multiplexing, OFDM in the downlink and Discrete Fourier Transform, DFT, -spread OFDM in the uplink. The basic LTE downlink physical resource can thus be seen as a time-frequency grid as illustrated in FIG. 1a, where each resource element corresponds to one OFDM subcarrier during one OFDM symbol interval.

In the time domain, LTE downlink transmissions are organised into radio frames of 10 ms, each radio frame consisting of ten equally-sized subframes of length Tsubframe=1 ms. For normal cyclic prefix, one subframe consists of 14 OFDM symbols. The duration of each OFDM symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks, VRB, and physical resource blocks, PRB, has been introduced in LTE. The actual resource allocation to a UE is made in terms of VRB pairs. There are two types of resource allocations, localised and distributed. In the localised resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Downlink transmissions are dynamically scheduled, i.e., in each subframe the base station transmits control information about to which terminals data is transmitted and upon which resource blocks the data is transmitted, in the current downlink subframe. This control signalling is typically transmitted in the first 1, 2, 3 or 4 OFDM symbols in each subframe and the number n=1, 2, 3 or 4 is known as the Control Format Indicator, CFI. The downlink subframe also contains common reference symbols, which are known to the receiving device and used for coherent demodulation of e.g. the control information. A downlink system with CFI=3 OFDM symbols as control is illustrated in FIG. 1c.

From $3^{rd}$ Generation Partnership Project, 3GPP, LTE Release-11 onwards resource assignments can also be scheduled on the enhanced Physical Downlink Control Channel, EPDCCH. For Release-8 to Release-10 only Physical Downlink Control Channel, PDCCH, is available.

Irrespective of the technology, GSM, UMTS or LTE, the frequency resources are limited and may not be enough to meet the requirements of available resources.

SUMMARY

The object is to obviate at least some of the problems outlined above. In particular, it is an object to provide a first and a second radio communication device and a respective method performed thereby for communicating between the first and the second radio communication device. These objects and others may be obtained by providing a first and a second radio communication device and a method performed by a first communication device and a method performed by a second communication device according to the independent claims attached below.

According to an aspect a method performed by a first radio communication device for communicating with a second radio communication device is provided. The method comprises transmitting, on an unlicensed frequency band, to at least the second radio communication device, an indication of a duration of a guard period, wherein an upcoming data transmission is to be performed to the second radio communication device after the expiration of the guard period. The method further comprises during the guard period, sending and/or receiving information to/from at least one other radio communication device, the other communication device being the second radio communication device or a third communication device.

According to an aspect a method performed by a second radio communication device for communicating with a first radio communication device is provided. The method comprises receiving, from the first radio communication device, an indication of a duration of a guard period, wherein an upcoming data transmission is to be received after the expiration of the guard period; and during the guard period, sending and/or receiving information to/from the first radio communication device.

According to an aspect a first radio communication device adapted for communicating with a second radio communication device is provided. The first radio communication device comprises a processor and memory, the memory comprising instructions which when executed by the processor causes the first radio communication device to transmit, on an unlicensed frequency band, to at least the second radio communication device, an indication of a duration of a guard period, wherein an upcoming data transmission is to be performed to the second radio communication device after the expiration of the guard period; and to during the guard period, send and/or receive information to/from at least one other radio communication device, the other communication device being the second radio communication device or a third communication device.

According to an aspect a second radio communication device adapted for communicating with a first radio communication device is provided. The second radio communication device comprises a processor and memory, the memory comprising instructions which when executed by the processor causes the second radio communication device to receive, from the first radio communication device, an indication of a duration of a guard period, wherein an upcoming data transmission is to be received after the expiration of the guard period; and during the guard period, to send and/or receive information to/from the first radio communication device.

According to an aspect a first radio communication device for communicating with a second radio communication device is provided. The first radio communication device comprises a transmitting and receiving unit for transmitting, on an unlicensed frequency band, to at least the second radio communication device, an indication of a duration of a guard period, wherein an upcoming data transmission is to be performed to the second radio communication device after the expiration of the guard period, and for during the guard period, sending and/or receiving information to/from at least one other radio communication device, the other communication device being the second radio communication device or a third communication device.

According to an aspect a first radio communication device for communicating with a second radio communication device is provided. The first radio communication device comprises a transmitting and receiving unit for receiving, from the first radio communication device, an indication of a duration of a guard period, wherein an upcoming data transmission is to be received after the expiration of the guard period, and for during the guard period, sending and/or receiving information to/from the first radio communication device.

The method performed by the first radio communication device, the method performed by the second radio communication device, the first radio communication device and the second radio communication device may have several advantages. One advantage is that the resource usage of the unlicensed frequency band are more efficient since resources may be used even during the guard period where the resources otherwise are wasted. The amount of control information that need to be exchanged outside the data transmission and previously outside the guard period may be reduced since at least some control information may be exchanged during the guard period.

BRIEF DESCRIPTION OF DRAWINGS

Embodiments will now be described in more detail in relation to the accompanying drawings, in which.

DETAILED DESCRIPTION

Briefly described, a first and a second radio communication device and a respective method performed thereby are provided for communicating between the radio communication devices. The first and the second radio communication device make use of resources in the unlicensed frequency band. Further, since the unlicensed frequency band may be shared with other radio communication device of similar or dissimilar wireless technologies, the radio communication devices may contend for resources of the unlicensed frequency band. During the contention for resources, a first radio communication device may send a reservation message prior to engaging in communication with a second radio communication device. The reservation message may comprise an indication of a duration of a guard period when radio communication devices are not allowed to perform any transmissions, wherein a data transmission is to take place after expiration of the guard period. The first communication device may make use of the reserved resources during the guard period to for example transmit control and/or management information instead of wasting resources during the duration of the guard period.

The 3GPP initiative "License Assisted LTE", LA-LTE, aims to allow LTE equipment to operate in the unlicensed 5 GHz radio spectrum. The unlicensed 5 GHz spectrum is used as an extension to the licensed spectrum. Accordingly, devices connect in the licensed spectrum (primary cell) and may use carrier aggregation to benefit from additional transmission capacity in the unlicensed spectrum (secondary cell). To reduce the changes required for aggregating licensed and unlicensed spectrum, the LTE frame timing in the primary cell is simultaneously repeated in the secondary cell. Today, the unlicensed 5 GHz spectrum is mainly used by equipment implementing the Institute of Electrical and Electronics Engineers, IEEE, 802.11 Wireless Local Area Network, WLAN, standard. This standard is known under its marketing brand "Wi-Fi."

IEEE 802.11 equipments use a contention based medium access scheme. This scheme does not allow the wireless medium to be reserved at specific instances of time. Instead IEEE 802.11 compliant devices only support the immediate reservation of the wireless medium following the transmission of at least one medium reservation message, e.g. Request to Transmit, RTS, or Clear to Transmit, CTS, or others. To allow the LA-LTE frame in the secondary cell to be transmitted at recurring time intervals that are mandated by the LTE frame in the primary cell, an LA-LTE system may transmit at least one of the aforementioned medium reservation messages to block surrounding IEEE 802.11 compliant devices from accessing the wireless medium.

Figure 1A:
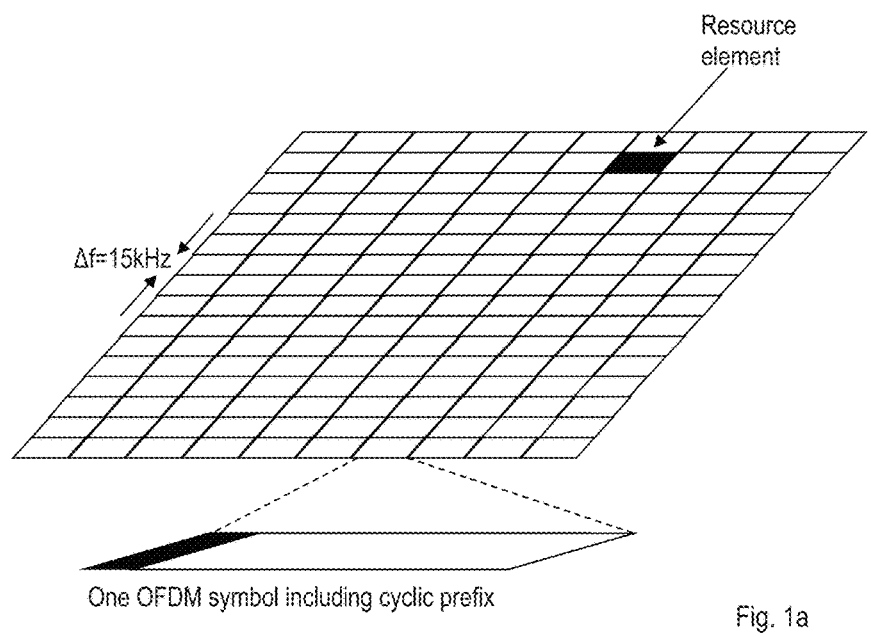
FIG. 1a is an illustration of LTE downlink physical resource.
Figure 1B:
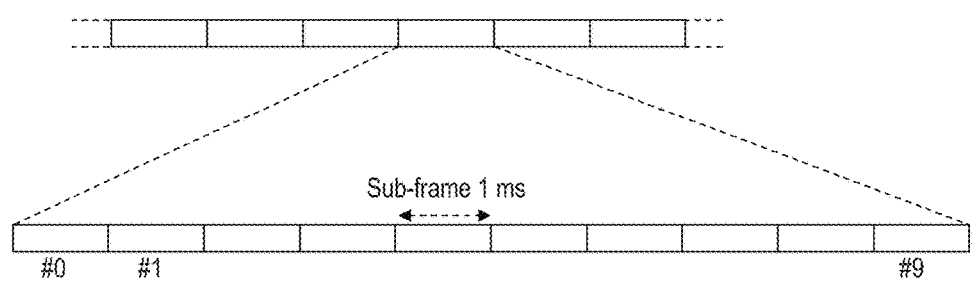
FIG. 1b is an illustration of LTE time domain structure.
Figure 1C:
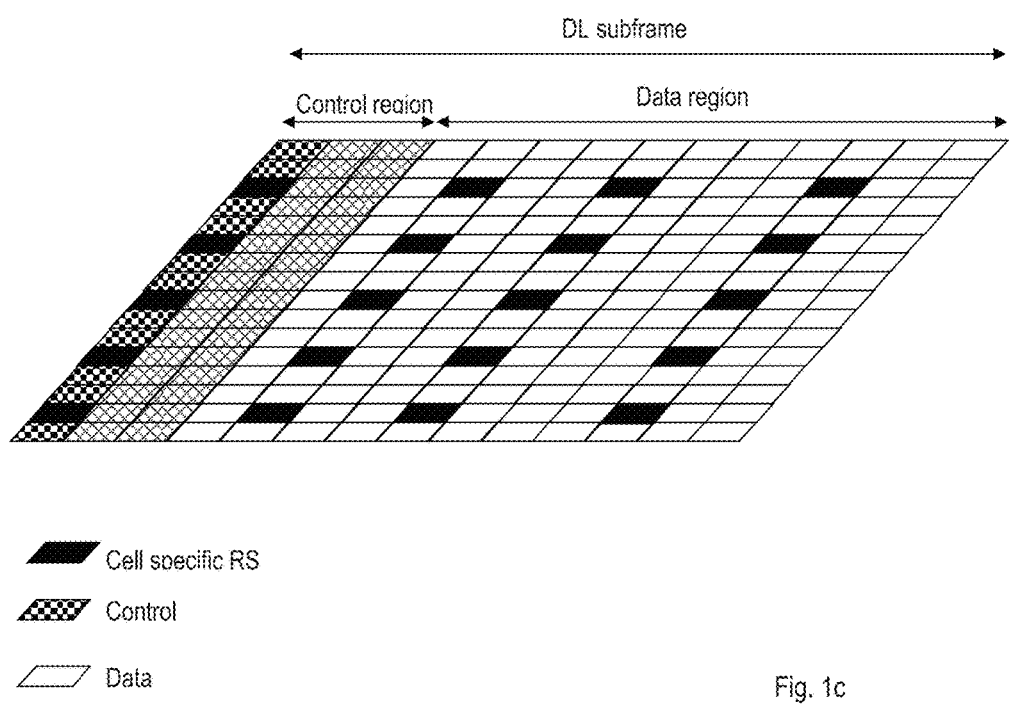
FIG. 1c is an illustration of an LTE downlink subframe.
Figure 1D:
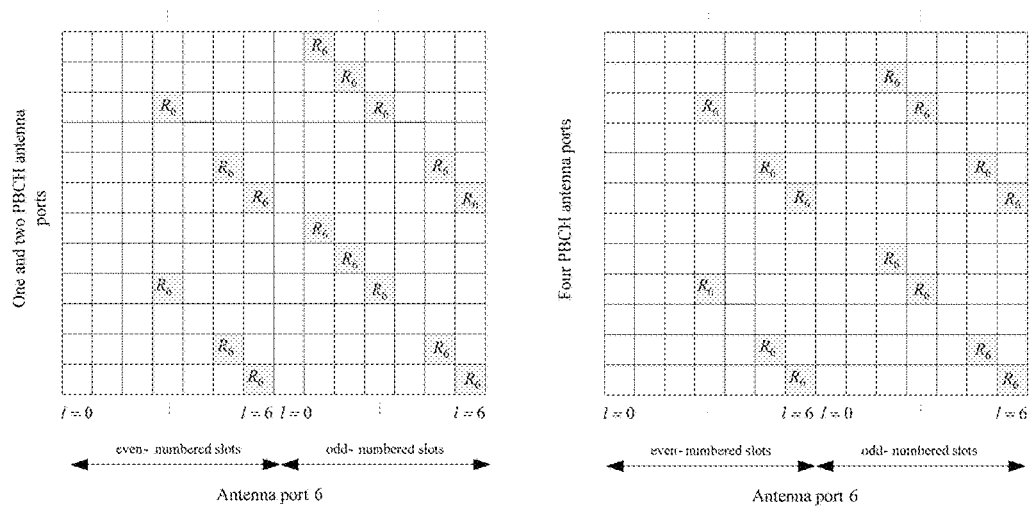
FIG. 1d is an illustration of positioning reference signals within a subframe carrying two CRS ports and four CRS ports.
Figure 1F:
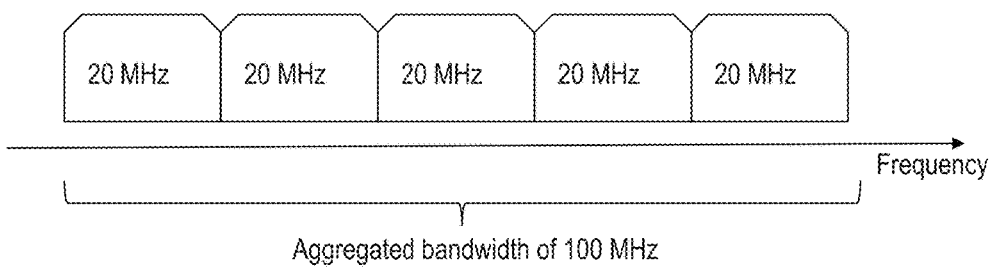
FIG. 1f is an illustration of aggregated bandwidth of 100 MHz.

The reference symbols shown in the FIG. 1c are the cell specific reference symbols and are used to support multiple functions including fine time and frequency synchronization and channel estimation for certain transmission modes. Other reference signals that may be present are the Positioning Reference Symbols, PRS, as shown in FIG. 1d. These symbols are defined so that they can co-exist with the cell specific reference symbols.

Other reference signals that are used in LTE are the Channel State Information Reference Signals, CSI-RSs, which are used for channel feedback related to transmission modes that use the UE-specific reference symbols for channel estimation. The CSI-RSs may occur in two pairs of OFDM symbols in the second slot of a subframe and one pair of OFDM symbols in the first slot. The UE-specific reference signals also referred to as the DeModulation RS, DM-RS, occur in the last pair of OFDM symbols in each slot.

Embodiments of a method performed by a first radio communication device for communicating with a second communication device will now be performed with reference to FIGS. 2a-2d.

Figure 2A:
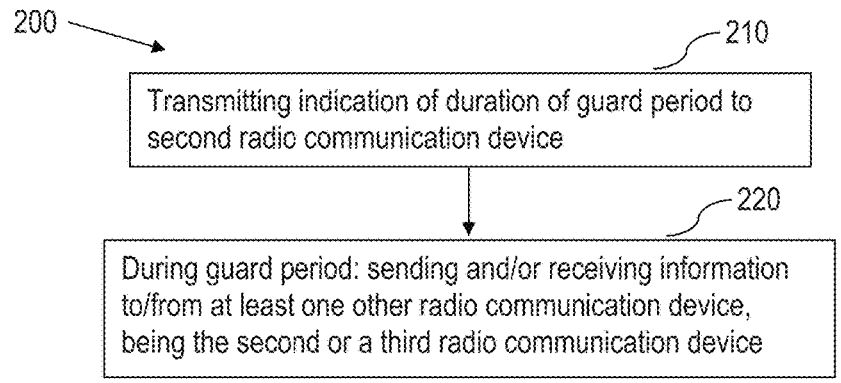
FIG. 2a is a flowchart of a method performed by a first communication device for communicating with a second communication device according to an exemplifying embodiment.

FIG. 2a is a flowchart of a method performed by a first radio communication device for communicating with a second radio communication device according to an exemplifying embodiment.

FIG. 2a illustrates the method 200 comprising transmitting 210, on an unlicensed frequency band, to at least the second radio communication device, an indication of a duration of a guard period, wherein an upcoming data transmission is to be performed to the second radio communication device after the expiration of the guard period. The method further comprises during the guard period, sending and/or receiving 220 information to/from at least one other radio communication device, the other communication device being the second radio communication device or a third communication device.

The first, second and the third radio communication device may be e.g. a Radio Base Station, RBS, such as for example a Base Station, BS, a Node B, NB, an evolved NB, eNB, or a client device such as for example a User Equipment, UE, a Mobile Station, MS, a mobile telephone, a laptop, a personal digital assistant or any other portable device comprising means for radio communication with another device. In an example, the first radio communication device is an RBS and the second and third radio communication devices are UEs. In a further example, the first radio communication device is an RBS and the second radio communication device is a UE and the third (or other radio communication devices) are RBSs. In still an example, the first radio communication device is a UE and the second radio communication device is an RBS. Thus the different radio communication devices may be any combination of the above examples of possible radio communication devices.

The method comprises the first radio communication device transmitting an indication of a duration of a guard period to at least the second radio communication device. The indication is transmitted on the unlicensed frequency band, e.g. on a channel of a WiFi network operating on the unlicensed frequency band. After the expiration of the guard period, the upcoming data transmission is to be performed to the second radio communication device. There are different examples of how to transmit the indication. Typically, in communication networks operating on the unlicensed frequency band, radio communication devices contend to use resources (e.g. a channel) of the unlicensed frequency band. A radio communication device may send a reservation message attempting to reserve resources of the unlicensed frequency band, e.g. an RTS or a CTS message. These messages may then comprise the indication of the duration of the guard period, e.g. in a Network Allocation Vector, NAV. The NAV may further comprise indication of when in time the data transmission is to occur and the duration of the data transmission, or the size of the data to be transmitted. The NAV may, in an example, further comprise an indication of which frequency resources out of the frequency resources of the unlicensed frequency band are to be used for the upcoming data transmission. Thus, the CTS and also the RTS may comprise information indicating both the duration of the guard period and the duration of the data transmission. Together, the guard period and the duration of the data transmission may be referred to as a frame exchange period. In other words, the first radio communication device may transmit e.g. a CTS message, wherein the CTS message may comprise information from which, at least one of an indication of the duration of the guard period, the duration of the data transmission and the duration of the frame exchange period is derivable.

Instead of transmitting the indication to a dedicated radio communication device, the indication may be transmitted to a plurality of radio communication devices by addressing the indication to a special, reserved Medium Access Control, MAC, address that could be uniquely reserved for this purpose.

The guard period indicates to all receiving radio communication devices, which receive the indication, that they should refrain from transmitting during the duration of the guard period. Thus, during the duration of the guard period, the requested resources of the unlicensed frequency band are left unused by all radio communication devices that received the indication of the duration of the guard period.

The first radio communication device then, during the guard period, sends and/or receives information to/from at least one other radio communication device, the other communication device being the second radio communication device or a third communication device using the unused frequency resources of the unlicensed frequency band. As will be explained in more detail below, the information may be different types of information (e.g. management and/or control information) and the other radio communication device(s) may include second radio communication device but does not have to.

Further, if the first and second radio communication device e.g. are LTE radio devices, e.g. an eNB and a UE, the control information is LTE control information.

The method performed by the first radio communication device may have several advantages. One advantage is that the resource usage of the unlicensed frequency band are more efficient since resources may be used even during the guard period where the resources otherwise are wasted. The amount of control information that need to be exchanged outside the data transmission and previously outside the guard period may be reduced since at least some control information may be exchanged during the guard period.

According to an embodiment, sending and/or receiving 220 information to/from at least the one other radio communication device comprises contending 230 with other radio communication devices, not being the second radio communication device, for the upcoming data transmission to the second radio communication device after the expiration of the guard period.

Merely as an example, the first radio communication device is an RBS, referred to as RBS-A, and the other radio communication devices also RBSs, in this example two, are denoted RBS-B and RBS-C. The second radio communication device is a UE. Then, contending 230 with other radio communication devices comprises RBS-A contending 230 with other radio communication devices for the upcoming data transmission to the UE. Thus, even if RBS-A transmitted the indication of the duration of the guard period on the unlicensed frequency band, any of RBS-A, RBS-B and RBS-C may end up transmitting data to the UE after the guard period has expired. The contention for the upcoming data transmission to the second radio communication device is also performed on the unlicensed frequency band, during the guard period, and thus the resources of the unlicensed frequency band are not wasted during the guard period.

Contention based medium access during the guard time interval may follow the procedures known from IEEE 802.11 or implement other, distributed medium access rules. An example competition based medium access scheme may follow the Slotted Aloha approach where transmission may be initiated only at certain slot boundaries. In the present invention the slot boundaries may be aligned to the OFDM symbol duration.

The contention for resources may be performed in different ways as will be explained below.

Figure 2B:
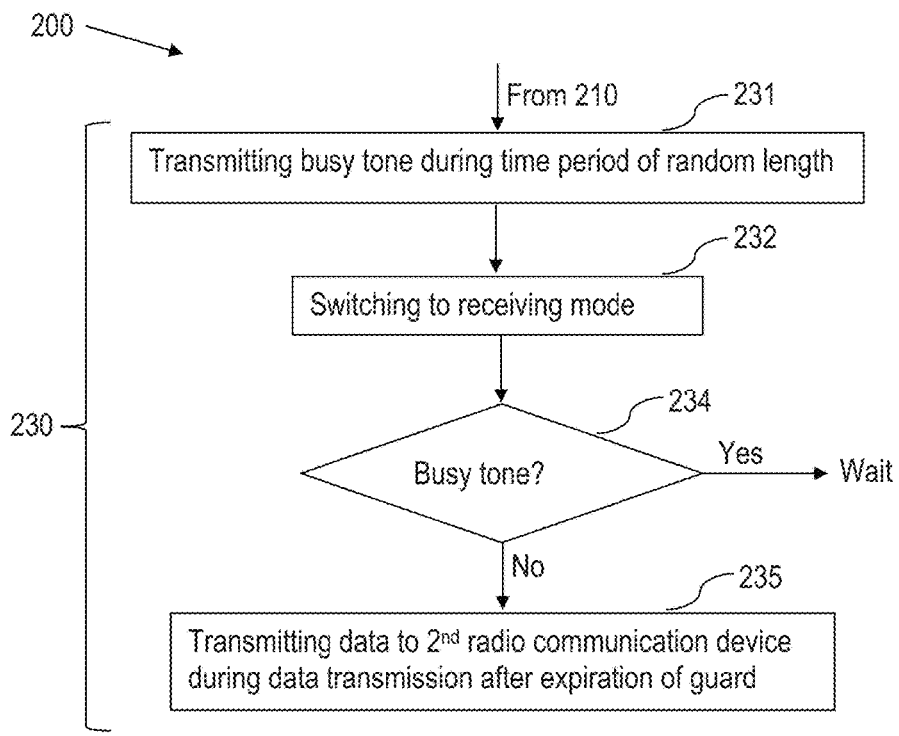
FIG. 2b is a flowchart of a method performed by a first communication device for communicating with a second communication device according to yet an exemplifying embodiment.

According to an embodiment, illustrated in FIG. 2b, contending 230 with other radio communication devices for the upcoming data transmission after the expiration of the guard period comprises transmitting 231 a busy tone during a time period of random length, switching 232 to receiving mode, and if the first communication device does not receive a busy tone from another radio communication device then the method comprises transmitting 235 data to the second radio communication device during the data transmission after the expiration of the guard period.

Reverting to the example above with RBS-A, RBS-B, RBS-C and the UE, after transmitting the indication of the duration of the guard period, RBS-A, RBS-B and RBS-C contend for the upcoming data transmission to the UE. RBS-A, RBS-B and RBS-C may all transmit a busy tone during a time period of random length. Thus the busy tone of RBS-A is of a different length than the respective busy tones of RBS-B and RBS-C, the busy tone of RBS-B is of a different length than the respective busy tones of RBS-A and RBS-C since the respective length of the three busy tones is random. The respective RBS transmits its busy tone and as soon as the respective RBS is done transmitting the busy tone, the respective RBS switches to a receiving mode.

Merely as an example, the busy tone of RBS-A is longer than the busy tone of RBS-B which in turn is longer than the busy tone of RBS-C. Thus, since RBS-C transmits the shortest busy tone, RBS-C will be the first to switch to receiving mode, and since RBS-A and RBS-B are still transmitting their respective busy tone, RBS-C will receive their respective busy tone (thus RBS-C receives information in the form of busy tones from the RBS-A and RBS-B, and RBS-A and RBS-B are sending information to RBS-C). In this manner, RBS-C is informed that it has lost the contention for the upcoming data transmission to the UE. Next, RBS-B will be done transmitting its busy tone, while RBS-A is still transmitting its busy tone, and thus RBS-B will switch to receiving mode and will receive the busy tone transmitted by RBS-A. In this manner, RBS-B is informed that it has lost the contention for the upcoming data transmission to the UE. Then, when RBS-A is done transmitting its busy tone, RBS-A switches to receiving mode and will not receive anything. Thus, RBS-A (first radio communication device) may conclude that it has won the contention for the upcoming data transmission to the UE and may transmit data to the UE (second radio communication device) during the upcoming data transmission after the expiration of the guard period.

Transmitting and/or receiving the busy tone is an example of sending and/or receiving 220 information to/from at least one other radio communication device, the other communication device being the second radio communication device or a third communication device. In the example above, the "third" radio communication device is RBS-B and RBS-C, thus the third radio communication device may be one or more radio communication devices.

Figure 2C:
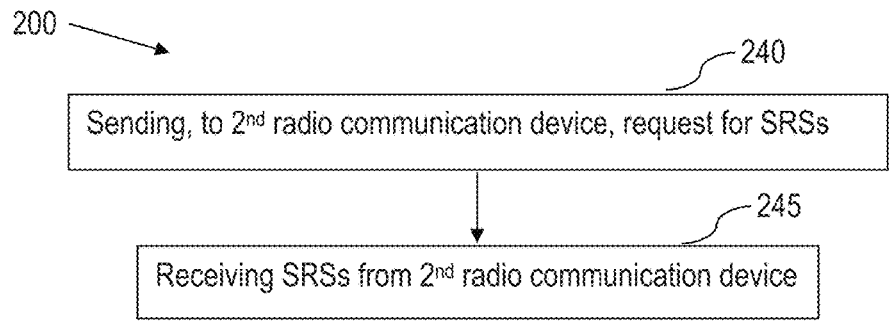
FIG. 2c is a flowchart of a method performed by a first communication device for communicating with a second communication device according to still an exemplifying embodiment.

Sending and/or receiving 220 information to/from at least the one other radio communication device may comprise sending 240, to the second radio communication device, a request for Sounding Reference Symbols, SRSs, and receiving 245 SRSs from the second radio communication device. This is also illustrated in FIG. 2c.

As stated above, the information may be different types of information (e.g. management and/or control information) and the other radio communication device(s) may include second radio communication device but does not have to.

The control information is sent on the unlicensed frequency band, i.e. on a resource or channel of the unlicensed frequency band. If the first and the second radio communication device are comprised in a radio communication network operating on a licensed frequency band, e.g. LTE, UMTS, or GSM, the control information transmitted on the unlicensed frequency band is related to information specific for the LTE, UMTS, or GSM communication network. For example, if the first radio communication device is an RBS such as an eNB of an LTE network and the second radio communication device is a UE of the LTE network, then the RBS may transmit a request for SRS to the UE and then receive SRS transmitted from the UE.

In this manner, unlicensed frequency band may allow client devices such as the second radio communication device to send data in the uplink direction or to transmit SRSs for example. In the case where the guard time interval is at least as long as one LTE OFDM symbol (e.g. 71.4 µs), multiple SRS signals from different radio communication devices may be transmitted simultaneously in one LTE OFDM symbol at different subcarriers. The SRS may then allow the eNB to achieve better link adaptation and Multiple Input Multiple Output, MIMO, pre-coding.

In an example, sending and/or receiving 220 information to/from at least the one other radio communication device comprises transmitting control information to at least the second radio communication device.

There are many examples of control information that may be transmitted from the first radio communication device to at least the second radio communication device. Reverting to the example of the first radio communication device being an RBS such as an eNB of an LTE network and the second radio communication device being a UE of the LTE network, the RBS may transmit control information at least to the UE, but also to other UEs or radio communication devices of the LTE network, wherein the control information relate to the LTE network.

According to an embodiment, wherein the first and the second radio communication devices are comprised in a communication network operating on a licensed frequency band such as an LTE network, wherein transmitting control information to at least the second radio communication device comprises transmitting, on the unlicensed frequency band a Physical Downlink Control Channel, PDCCH, associated with licensed frequency band to the second radio communication device.

Again with reference to the example above, this is a further example of the control information that may be sent from the first radio communication device, e.g. an RBS, to at least the second radio communication device, e.g. one or more UEs.

The PDCCH is used to carry Downlink Control Information, DCI, such as scheduling decisions and power-control commands. More specifically, the DCI may include downlink scheduling assignments, including Physical Downlink Shared Channel, PDSCH, resource indication, transport format, Hybrid Automatic repeat Request, HARQ, information, and control information related to spatial multiplexing (if applicable). A downlink scheduling assignment also includes a command for power control of the Physical Uplink Control Channel, PUCCH used for transmission of HARQ acknowledgements in response to downlink scheduling assignments.

Further, the DCI may include uplink scheduling grants, including PUSCH resource indication, transport format, and HARQ-related information. An uplink scheduling grant also includes a command for power control of the PUSCH. Still further, the DCI may include power-control commands for a set of radio communication devices as a complement to the commands included in the scheduling assignments/grants.

The guard time interval may constitute system control region if the interval is at least as long as one LTE OFDM symbol (e.g., 71.4 µs). In general, the system control region may be organised as n LTE OFDM symbols when the guard time interval is at least as long as n×71.4 µs. Within this system control region, at least one LA-LTE access point, e.g. an RBS such as an eNB, from the same LA-LTE network may transmit at least PDCCH that carries system control information.

The system control PDCCH may be scrambled with an Unlicensed Band Secondary Cell control Radio Network Temporary identifier, UBSC-RNTI, to indicate its system control information content type. The search space and the interleaving pattern of the at least one PDCCH from an LA-LTE is determined by the cell identification, cell-ID, of the LA-LTE Access Point, AP, (instead of the UE-ID as for conventional PDCCH targeting the UE). Note that a LA-LTE AP may operate more than one LA-LTE carriers, each of which may be assigned a unique cell-ID.

The control channel may carry the number of LTE subframes that the AP, e.g. the RBS, intends to occupy subsequently. The control channel may carry indication of the uplink/downlink subframe patterns for the subsequent LTE subframes from the AP. The uplink/downlink subframe pattern may be indicated via a bit map. The control channel may further indicate a load of the AP. The load indication may be in the form of number of LA-LTE devices connected. The load indication may also be in the form of average percentage of occupied subframes. The control channel may further carry the buffer status at the AP. The control channel may contain the number of subframes the AP has not been able to access the unlicensed band channel resource.

Reference symbols may be transmitted in the guard time and these reference symbols may be used either by radio communication devices such as UEs or other RBSs. At the second radio communication device, such as e.g. a UE, the reference signals may be used to assist receiver processing of the system control PDCCH. At the first radio communication device, such as e.g. the RBS, the reference symbols may be used to aid in reception of any management messages exchanged between RBSs as well as to assist in maintaining synchronisation or some pre-defined frame timing offsets between RBSs.

One PDCCH carries one DCI message with one of the formats above. As multiple UEs can be scheduled simultaneously, on both downlink and uplink, there should be a possibility to transmit multiple scheduling messages within each subframe. Each scheduling message may be transmitted on a separate PDCCH, and consequently there may be multiple simultaneous PDCCH transmissions within each cell, i.e. from each radio communication device acting as an RBS such as an eNB. Furthermore, to support different radio-channel conditions, link adaptation may be used, where the code rate of the PDCCH may be selected to match the radio-channel conditions.

To allow for simple yet efficient processing of the control channels in the second radio communication device, e.g. a UE, the mapping of PDCCHs to resource elements is subject to a certain structure. This structure is based on Control-Channel Elements, CCEs, which consists of nine Resource Element Groups, REGs, wherein one REG comprises four resource elements. The number of CCEs, one, two, four, or eight, required for a certain PDCCH depends on the payload size of the control information (DCI payload) and a channel-coding rate. This is used to realise link adaptation for the PDCCH; if the channel conditions for the radio communication device to which the PDCCH is intended are disadvantageous, a larger number of CCEs needs to be used compared to the case of advantageous channel conditions. The number of CCEs used for a PDCCH is also referred to as the aggregation level, AL.

Figure 1E:
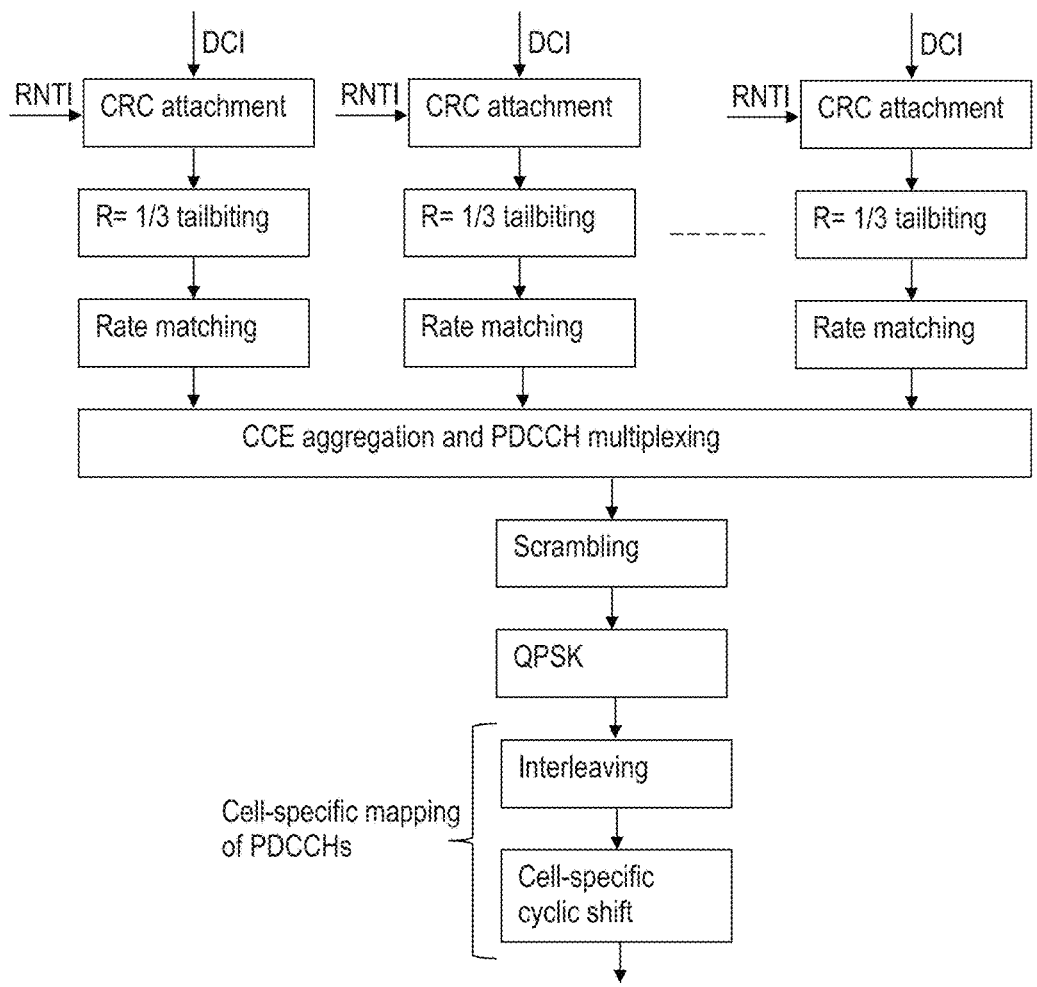
FIG. 1e is an illustration of processing procedures for PDCCHs.

The network may then select different aggregation levels and PDCCH positions for different UEs from the available PDCCH resources. For each PDCCH, as illustrated in FIG. 1e, a CRC is attached to each DCI message payload. The identity of the UE (or UEs) addressed—that is, the RNTI—may be included in the CRC calculation and not explicitly transmitted. Depending on the purpose of the DCI message (unicast data transmission, power-control command, random-access response, etc.), different RNTIs may be used; for normal unicast data transmission, the terminal-specific C-RNTI may be used. After CRC attachment, the bits are coded with a rate-⅓ A tail-biting convolutional code and rate-matched to fit the amount of resources used for PDCCH transmission. After the PDCCHs to be transmitted in a given subframe have been allocated to the desired resource elements, the details of which are given below, the sequence of bits corresponding to all the PDCCH resource elements to be transmitted in the subframe, including the unused resource elements, may be scrambled by a cell- and subframe-specific scrambling sequence to randomise inter-cell interference, followed by Quadrature Phase Shift Keying, QPSK, modulation and mapping to resource elements. The entire collection of the REGs, including those unused by any PDCCH, may then be interleaved across entire control region to randomise inter-cell interference as well as capturing frequency diversity for the PDCCHs.

LTE defines so-called search spaces, which describe the set of CCEs the UE is supposed to monitor for scheduling assignments/grants relating to a certain component carrier. A search space is a set of candidate control channels formed by CCEs on a given aggregation level, which the UE is supposed to attempt to decode. As there are multiple aggregation levels, corresponding to one, two, four, and eight CCEs, a UE has multiple search spaces. In each subframe, the UEs will attempt to decode all the PDCCHs that can be formed from the CCEs in each of its search spaces. If the CRC checks, the content of the control channel is declared as valid for this UE and the UE processes the information (scheduling assignment, scheduling grants, etc.). Each UE in the communication network therefore has a UE-specific search space at each aggregation level.

In several situations, there is a need to address a group of, or all, UEs in the system. To allow all UEs to be addressed at the same time, LTE has defined common search spaces in addition to the UE-specific search spaces. A common search space is, as the name implies, common, and all UEs in the cell, the cell being a coverage area of an RBS, monitor the CCEs in the common search spaces for control information. Although the motivation for the common search space is primarily transmission of various system messages, it can be used to schedule individual UEs as well. Thus, it can be used to resolve situations where scheduling of one UE is blocked due to lack of available resources in the UE-specific search space. The common search space is not dependent of UE configuration status. Therefore, the common search space may be used when the LTE network needs communicate with the UE during UE reconfiguration periods.

Transmitting control information to the second radio communication device may comprise transmitting reference symbols to the second radio communication device.

There are different examples of reference symbols that may be sent to the second communication device, or at least to the second communication device. In case the first and second communication devices again are LTE radio communication device, the first radio communication device, e.g. the RBS, may send different types of reference symbols to a UE and/or other RBSs.

In case the first and second communication devices instead are UMTS devices, the RBS, e.g. a NB, may send pilot signals, or control signals, to at least the second communication device, e.g. a mobile station.

The reference symbols may be Positioning Reference Symbols, PRSs, and Cell-specific Reference Symbols, CRSs, Cell State Information Reference Symbols, CSI-RSs, the last CRS of an LTE subframe and a DeModulation Reference Symbol, DM-RS, or CRSs and the CRSs are transmitted in a first Orthogonal Frequency Diversity Multiplexing, OFDM, symbol.

As stated above, there are different examples of reference symbols that may be sent to the second communication device, or at least to the second communication device. The PRS, CRS, DMRS and the combination of those above are some examples.

LTE PRSs are transmitted in the OFDM symbols before the start of the LTE subframe along with CRSs. The PRS and the CRS are transmitted so that the last OFDM symbol before the start of the LTE subframe corresponds to the end of a normal LTE subframe. When the guard time interval exceeds one subframe, the PRS may be transmitted in all the subframes using the same configuration as is defined in LTE for per subframe. The PRS and the CRS along with system control information carried in the first three OFDM symbols of a subframe by the PDCCH occupies every OFDM symbol in the guard interval while providing support for important system functions for operation of the LA-LTE system. The CRS and the PRS may be used for important functions at the client receiver such as fine time/frequency offset estimation and Automatic Gain Control, AGC. Furthermore, the CRS may be used to enhance channel estimation so that the PDCCH and possibly PDSCH signals received in the first subframe may be received without any performance degradation.

When the number of OFDM symbols in the guard interval is less than 5, i.e., the guard interval is 5×71.4 µs or less, the CSI-RS and the last symbol of the CRS may be transmitted in the guard interval. The CSI-RS may be used by the second radio communication device, i.e. the UE, to facilitate early CSI feedback so that data transmissions may occur using the latest channel state information. Multiple CSI-RS processes may be used which span different pairs of symbols so that the CSI-RS and one symbol of the CRS together occupy 5 OFDM symbols. The different CSI-RS processes may represent different antenna ports.

When the guard interval is 3×71.4 µs or less, the three OFDM symbols may carry the last symbol of the CRS in a subframe and the DM-RS that will be used in the subsequent first subframe carrying control and data transmissions. The DM-RS in each Resource Block, RB, may be the same DM-RS that is transmitted in the last two symbols of the first slot of the first subframe. This allows the UE to improve channel estimation for the reception of any UE-specific transmissions in the first subframe which may compensate for greater timing, frequency and AGC errors caused by a long pause in the reception of any signals.

Only the CRSs are transmitted in the system control region by treating the start of the system control region as the start of a LTE subframe. In a further non-limiting exemplary implementation, the CRS that are normally transmitted in the first LTE OFDM symbol in a normal LTE subframe can be repeated in every OFDM symbols of the system control region.

According to an embodiment, data to be transmitted in a first subframe of the upcoming data transmission is transmitted also during the guard period so that a last OFDM symbol before the start of the first subframe of the data transmission carries the same information as the last OFDM symbol of the first subframe, wherein the last OFDM symbol before the start of the first subframe of the data transmission comprises both data and reference symbols.

These repeated symbols including data and reference symbols may be used by the second radio communication device, e.g. the UE, to enhance the reception of the data in the first subframe which may compensate for greater timing, frequency and AGC errors caused by a long pause in the reception of any signals.

The transmission format used during the guard period may be compliant with the unlicensed frequency band.

Thus, after the reservation message, part of the transmission from a base station may be e.g. Wi-Fi compliant and the remainder of the transmission may be compliant with a scheduled system operating on a licensed frequency band such as LA-LTE. Furthermore, the Wi-Fi compliant transmissions may be used in the UE to adjust time and frequency estimates and perform gain control when the UE implementation allows such sharing of physical parameter estimates between the Wi-Fi and LA-LTE receivers.

The above examples and embodiments may be combined in any manner to provide further enhanced utility. In an exemplary combination, a guard time internal of duration at least $(n+1) \times 71.4$ μs is divided into a system control region of n LTE OFDM symbols and a SRS region of 1 LTE OFDM symbol.

Figure 2D:
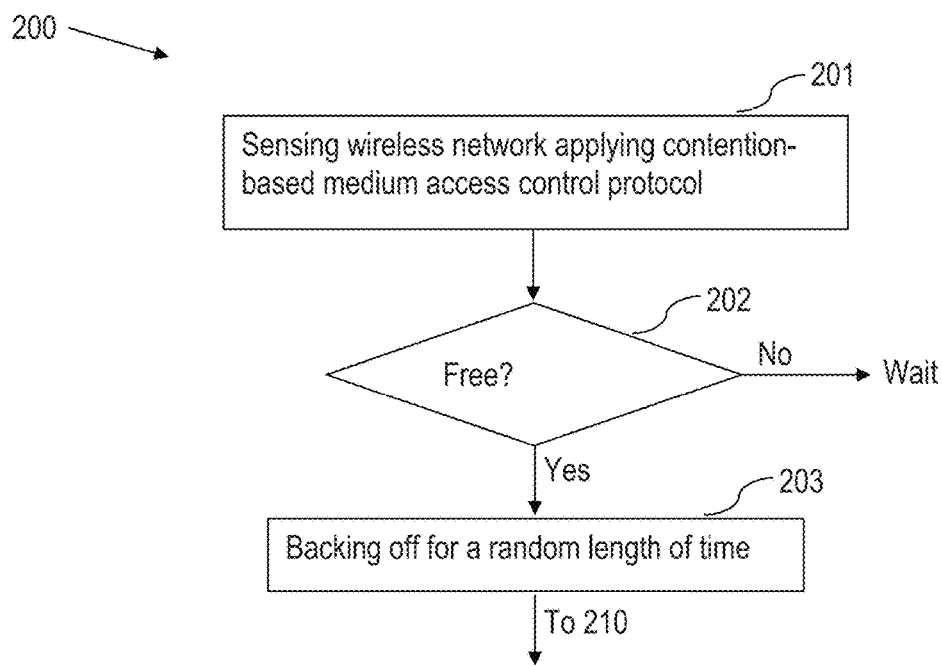
FIG. 2d is a flowchart of a method performed by a first communication device for communicating with a second communication device according to a further exemplifying embodiment.

The method may further comprise, as illustrated in FIG. 2d, prior to transmitting 210 the indication of the duration of the guard period, sensing 201 the unlicensed frequency band and if the unlicensed frequency band is free, then backing off 202 for a random length of time before transmitting 210 the indication of the duration of the guard period.

In order not to collide or disturb a possible ongoing transmission on the unlicensed frequency band, the first radio communication device first senses the unlicensed frequency band. If the unlicensed frequency band is free, the first radio communication device back off for a random length of time before transmitting 210 the indication of the duration of the guard period. This is done in order to avoid collision on the unlicensed frequency band and in accordance with a contention based medium access control protocol. Once the first radio communication device successfully has performed a random medium access, the first radio communication device transmits the indication of the duration of the guard period. The first radio communication device may comprise a channel sensing entity which observes the state of the unlicensed frequency band and which may detect if transmissions of similar or dissimilar technologies occur on the unlicensed frequency band.

The 3GPP LTE Release-10 standard supports bandwidths larger than 20 MHz. One important requirement on 3GPP LTE Release-10 is to assure backward compatibility with 3GPP LTE Release-8. This should also include spectrum compatibility. That would imply that an LTE Release-10 carrier, wider than 20 MHz, should appear as a number of LTE carriers to an LTE Release-8 UE. Each such carrier can be referred to as a Component Carrier, CC. In particular for early 3GPP LTE Release-10 deployments it can be expected that there will be a smaller number of 3GPP LTE Release-10-capable UEs compared to many LTE legacy UEs. Therefore, it is necessary to assure an efficient use of a wide carrier also for legacy UEs, i.e. that it is possible to implement carriers where legacy UEs may be scheduled in all parts of the wideband 3GPP LTE Release-10 carrier. The straightforward way to obtain this would be by means of Carrier Aggregation, CA. CA implies that an 3GPP LTE Release-10 UE may receive multiple CC, where the CC have, or at least the possibility to have, the same structure as a Release-8 carrier. CA is illustrated in FIG. 1g.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a UE: A UE may for example support more downlink CCs than uplink CCs, even though the cell is configured with the same number of uplink and downlink CCs.

Scheduling of a CC is done on the PDCCH via downlink assignments. Control information on the PDCCH is formatted as a DCI message. In Release-8 a UE only operates with one DL and one UL CC, the association between DL assignment, UL grants and the corresponding DL and UL CCs is therefore clear. In Release-10 two modes of CA should be distinguished: The first case is similar to the operation of multiple Release-8 terminals, a DL assignment or UL grant contained in a DCI message transmitted on a CC is either valid for the DL CC itself or for associated (either via cell-specific or UE specific linking) UL CC. A second mode of operation augments a DCI message with the Carrier Indicator Field, CIF. A DCI containing a DL assignment with CIF is valid for that DL CC indicted with CIF and a DCI containing an UL grant with CIF is valid for the indicated UL CC.

In the manner described above, a communication system using a scheduled medium access scheme, e.g. LTE, uses a primary, licensed frequency channel to transmit its frames. The example system uses a secondary frequency channel to simultaneously communicate in the unlicensed spectrum. The frame in the unlicensed frequency channel is synchronised to the frame in the licensed frequency channel meaning that a known time relation between primary and secondary cells respectively licensed and unlicensed frequency channels exist. In the unlicensed frequency channel, medium access of devices that implement carrier aggregation (or similar channel bonding or link trunking mechanisms) is controlled by communication in the licensed frequency channel. Communication in the unlicensed frequency channel cannot occur independently of the licensed frequency channel.

Figure 3A:
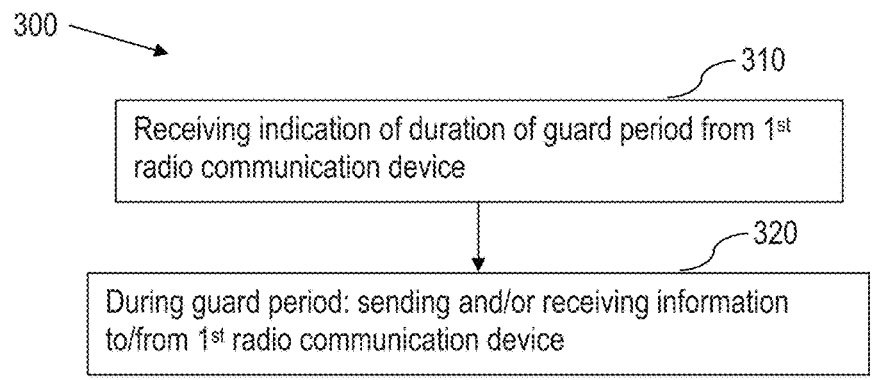
FIG. 3a is a flowchart of a method performed by a second communication device for communicating with a first communication device according to an exemplifying embodiment.

Embodiments herein also relate to a method performed by a second radio communication device for communicating with a first radio communication device. Embodiments of such a method will now be described with reference to FIGS. 3a and 3b. FIG. 3a illustrates the method comprising receiving 310, from the first radio communication device, an indication of a duration of a guard period, wherein an upcoming data transmission is to be received after the expiration of the guard period; and during the guard period, sending and/or receiving 320 information to/from the first radio communication device.

The first, second and the third radio communication device may be e.g. an RBS such as for example a BS a NB, an eNB, or a client device such as for example a UE a MS a mobile telephone, a laptop, a personal digital assistant or any other portable device comprising means for radio communication with another device. In an example, the first radio communication device is an RBS and the second radio communication device is a UE.

The second radio communication device, e.g. a UE, receives the indication of the duration of the guard period from the first radio communication device, e.g. an RBS. In this manner, the UE is informed that there now is an ongoing guard period of a specified duration, wherein radio communication devices should refrain from transmitting on the unlicensed frequency band. The UE is also informed that after expiration of the guard period, the UE will receive data during a data transmission.

The second radio communication device, e.g. the UE, may then utilise the guard period for sending and/or receiving information to/from the first radio communication device using the unlicensed frequency band.

The method performed by the second radio communication device may have the same advantages as the method performed by the first communication device. One advantage is that the resource usage of the unlicensed frequency band are more efficient since resources may be used even during the guard period where the resources otherwise are wasted. The amount of control information that need to be exchanged outside the data transmission and previously outside the guard period may be reduced since at least some control information may be exchanged during the guard period.

The sent and/or received information may comprise control information.

As described above, the control information is sent on the unlicensed frequency band, i.e. on a resource or channel of the unlicensed frequency band. If the first and the second radio communication device are comprised in a radio communication network operating on a licensed frequency band, e.g. LTE, UMTS, or GSM, the control information transmitted on the unlicensed frequency band is related to information specific for the LTE, UMTS, or GSM communication network.

Figure 3B:
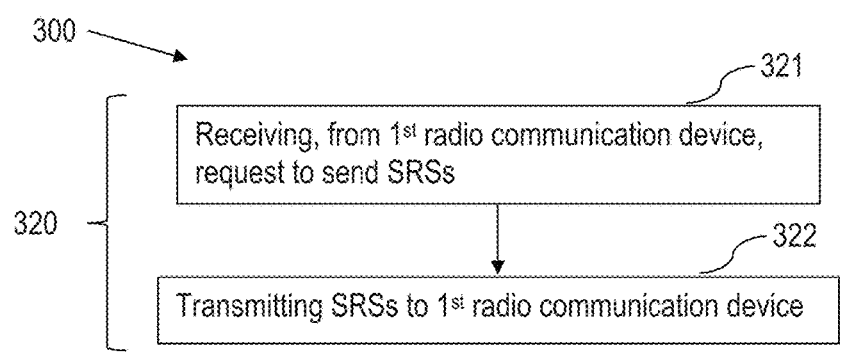
FIG. 3b is a flowchart of a method performed by a second communication device for communicating with a first communication device according to yet an exemplifying embodiment.

According to an embodiment, illustrated in FIG. 3b, sending and/or receiving 320 information comprises receiving 321 a request from the first radio communication device to send SRSs to the first radio communication device, and transmitting 322 SRSs to the first radio communication device.

Thus, after receiving the indication of the length of the guard period on during the ongoing guard period, the second radio communication device may receive the request from the first radio communication device to send SRSs to the first radio communication device. The second radio communication device then transmits SRSs to the first radio communication device on the unlicensed frequency band during the guard period as requested.

Figure 4:
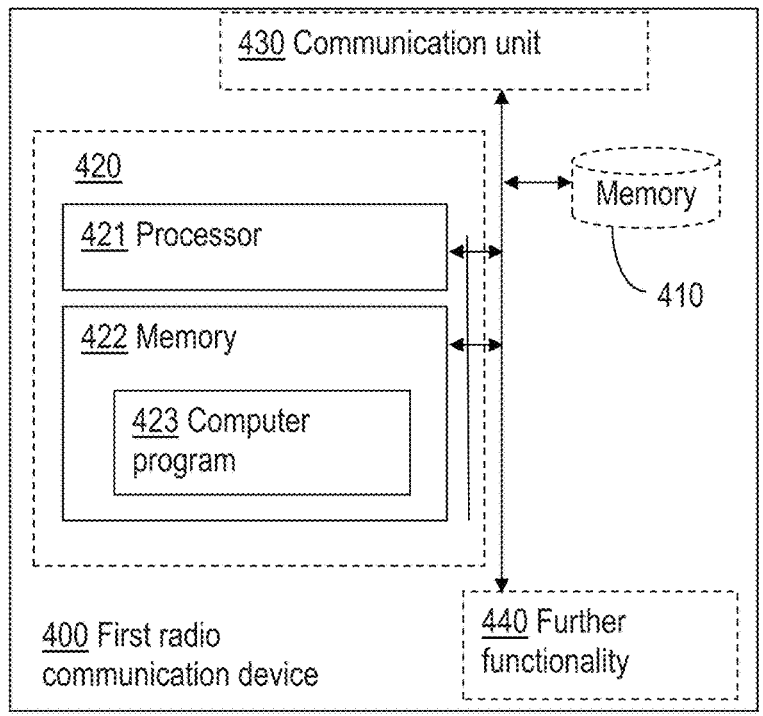
FIG. 4 is a block diagram of a first communication device adapted for communicating with a second communication device according to an exemplifying embodiment.

Embodiments herein also relate to a first radio communication device adapted for communicating with a second radio communication device. The first radio communication device has the same technical features, objects and advantages as the method performed by the first radio communication device. The first radio communication device will only be described in brief, with reference to FIG. 4, in order to avoid unnecessary repetition. FIG. 4 illustrates the first radio communication device 400 comprising a processor 421 and memory 422, the memory comprising instructions which when executed by the processor 421 causes the first radio communication device 400 to transmit, on an unlicensed frequency band, to at least the second radio communication device, an indication of a duration of a guard period, wherein an upcoming data transmission is to be performed to the second radio communication device after the expiration of the guard period; and to during the guard period, send and/or receive information to/from at least one other radio communication device, the other communication device being the second radio communication device or a third communication device.

The first radio communication device has the same possible advantages as the method performed by the first communication device. One advantage is that the resource usage of the unlicensed frequency band are more efficient since resources may be used even during the guard period where the resources otherwise are wasted. The amount of control information that need to be exchanged outside the data transmission and previously outside the guard period may be reduced since at least some control information may be exchanged during the guard period.

The memory 422 may further comprise instructions, which when executed by the processor 421 causes the first radio communication device 400 to contend with other radio communication devices, not being the second radio communication device, for the upcoming data transmission to the second radio communication device after the expiration of the guard period.

According to an embodiment, contending with other radio communication devices for the upcoming data transmission after the expiration of the guard period comprises transmitting a busy tone during a time period of random length, switching to receiving mode, and if the first communication device does not receive a busy tone from another radio communication device then transmitting data to the second radio communication device during the data transmission after the expiration of the guard period.

The memory 422 may further comprise instructions, which when executed by the processor 421 causes the first radio communication device 400 to send to the second radio communication device, a request for Sounding Reference Symbols, SRSs, and to receive SRSs from the second radio communication device.

The memory 422 may further comprise instructions, which when executed by the processor 421 causes the first radio communication device 400 to transmit control information to at least the second radio communication device.

According to an embodiment, the first and the second radio communication devices are comprised in a communication network operating on a licensed frequency band such as a Long Term Evolution, LTE, network, wherein the memory 422 further comprises instructions, which when executed by the processor 421 causes the first radio communication device 400 to transmit, on the unlicensed frequency band a Physical Downlink Control Channel, PDCCH, associated with licensed frequency band to the second radio communication device.

The memory 422 may further comprise instructions, which when executed by the processor 421 causes the first radio communication device 400 to transmit reference symbols to the second radio communication device.

The reference symbols may be PRSs and CRSs, CSI-RSs, the last CRS of an LTE subframe and a DM-RS, or CRSs and the CRSs are transmitted in a first OFDM symbol.

According to an embodiment, data to be transmitted in a first subframe of the upcoming data transmission is transmitted also during the guard period so that a last OFDM symbol before the start of the first subframe of the data transmission carries the same information as the last OFDM symbol of the first subframe, wherein the last OFDM symbol before the start of the first subframe of the data transmission comprises both data and reference symbols.

The transmission format used during the guard period may be compliant with the unlicensed frequency band.

The memory 422 may further comprise instructions, which when executed by the processor 421 causes the first radio communication device 400 to, prior to transmit the indication of the duration of the guard period, to sense the unlicensed frequency band and if the unlicensed frequency band is free, then to back off for a random length of time before transmitting the indication of the duration of the guard period.

Figure 5:
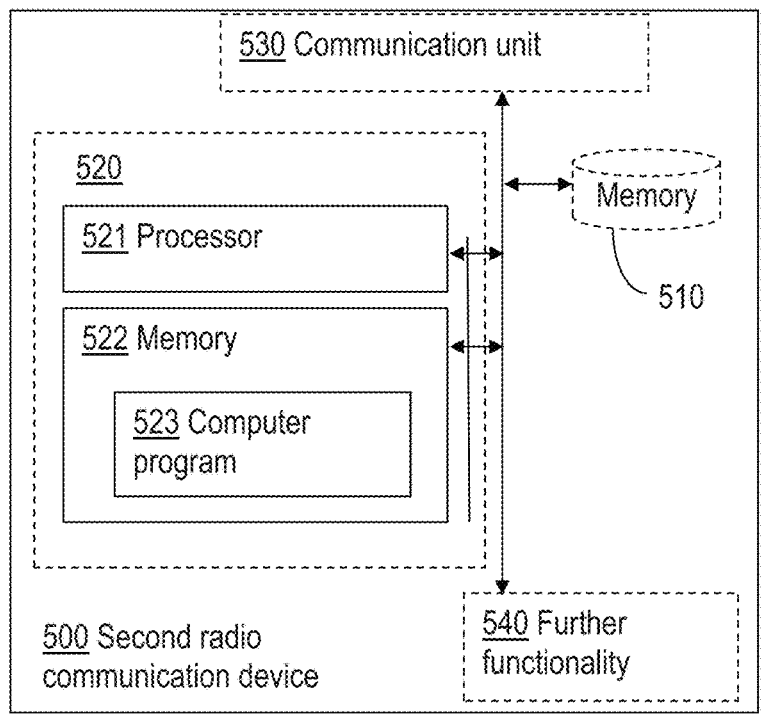
FIG. 5 is a block diagram of a second communication device adapted for communicating with a first communication device according to an exemplifying embodiment.

Embodiments herein also relate to a second radio communication device adapted for communicating with a first radio communication device. The second radio communication device has the same technical features, objects and advantages as the method performed by the second radio communication device. The second radio communication device will only be described in brief, with reference to FIG. 5, in order to avoid unnecessary repetition. FIG. 5 illustrates the second radio communication device 500 comprising a processor 521 and memory 522, the memory comprising instructions which when executed by the processor 521 causes the first radio communication device 500 to receive, from the first radio communication device, an indication of a duration of a guard period, wherein an upcoming data transmission is to be received after the expiration of the guard period; and during the guard period, to send and/or receive information to/from the first radio communication device.

The second radio communication device has the same possible advantages as the method performed by the second communication device. One advantage is that the resource usage of the unlicensed frequency band are more efficient since resources may be used even during the guard period where the resources otherwise are wasted. The amount of control information that need to be exchanged outside the data transmission and previously outside the guard period may be reduced since at least some control information may be exchanged during the guard period.

The sent and/or received information may comprise control information.

The memory 522 may further comprise instructions, which when executed by the processor 521 causes the second radio communication device 500 to receive a request from the first radio communication device to send SRSs to the first radio communication device, and to transmit SRSs to the first radio communication device.

Figure 6:
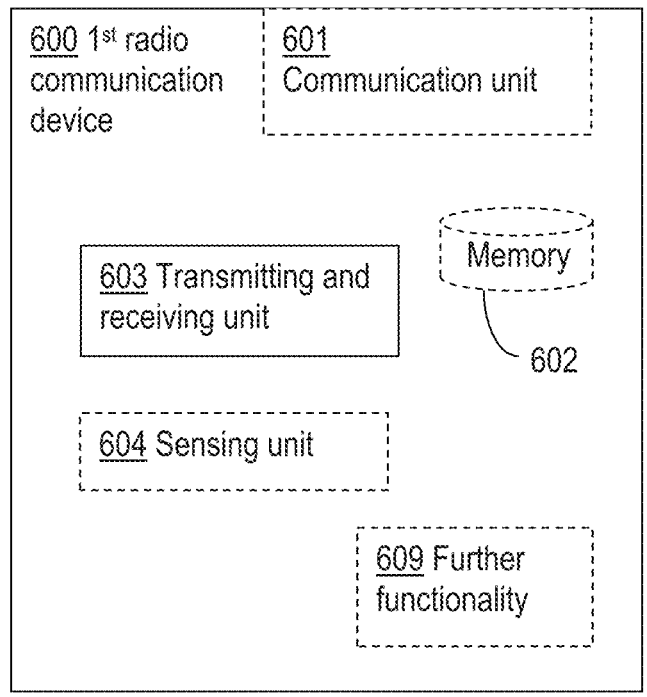
FIG. 6 is a block diagram of a first communication device for communicating with a second communication device according to an exemplifying embodiment.

Embodiments herein also relate to a first radio communication device for communicating with a second radio communication device. The first radio communication device has the same technical features, objects and advantages as the method performed by the first radio communication device and the first radio communication device described above with reference to FIG. 4. The first radio communication device will only be described in brief, with reference to FIG. 6, in order to avoid unnecessary repetition. FIG. 6 illustrates the first radio communication device 600 comprising a transmitting and receiving unit 603 for transmitting, on an unlicensed frequency band, to at least the second radio communication device, an indication of a duration of a guard period, wherein an upcoming data transmission is to be performed to the second radio communication device after the expiration of the guard period, and for during the guard period, sending and/or receiving information to/from at least one other radio communication device, the other communication device being the second radio communication device or a third communication device.

The first radio communication device has the same possible advantages as the method performed by the first communication device. One advantage is that the resource usage of the unlicensed frequency band are more efficient since resources may be used even during the guard period where the resources otherwise are wasted. The amount of control information that need to be exchanged outside the data transmission and previously outside the guard period may be reduced since at least some control information may be exchanged during the guard period.

Figure 7:
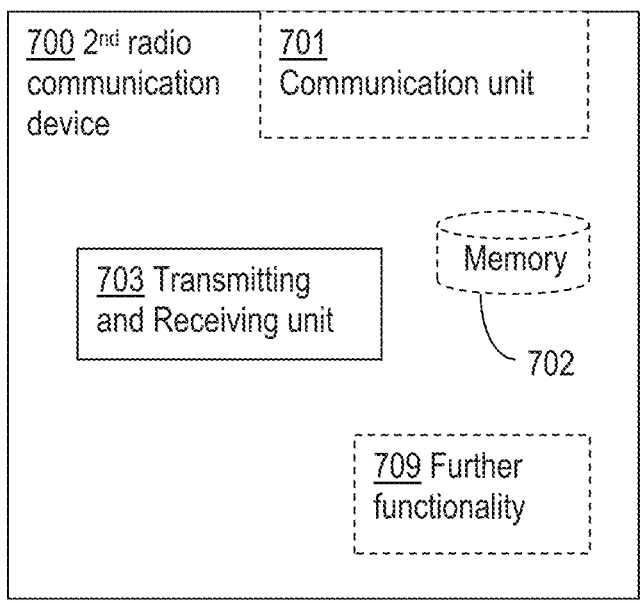
FIG. 7 is a block diagram of a second communication device for communicating with a first communication device according to an exemplifying embodiment.

Embodiments herein also relate to a second radio communication device for communicating with a first radio communication device. The second radio communication device has the same technical features, objects and advantages as the method performed by the second radio communication device and the second radio communication device described above with reference to FIG. 5. The second radio communication device will only be described in brief, with reference to FIG. 7, in order to avoid unnecessary repetition. FIG. 7 illustrates the second radio communication device 700 comprising a transmitting and receiving unit 703 for receiving, from the first radio communication device, an indication of a duration of a guard period, wherein an upcoming data transmission is to be received after the expiration of the guard period, and for during the guard period, sending and/or receiving information to/from the first radio communication device.

The second radio communication device has the same possible advantages as the method performed by the second communication device. One advantage is that the resource usage of the unlicensed frequency band are more efficient since resources may be used even during the guard period where the resources otherwise are wasted. The amount of control information that need to be exchanged outside the data transmission and previously outside the guard period may be reduced since at least some control information may be exchanged during the guard period.

In FIG. 6, the first radio communication device 600 is also illustrated comprising a communication unit 601. Through this unit, the first radio communication device 600 is adapted to communicate with other nodes and/or entities in the wireless communication network. The communication unit 601 may comprise more than one receiving arrangement. For example, the communication unit 601 may be connected to both a wire and an antenna, by means of which the first radio communication device 600 is enabled to communicate with other nodes and/or entities in the wireless communication network. Similarly, communication unit 601 may comprise more than one transmitting arrangement, which in turn is connected to both a wire and an antenna, by means of which the first radio communication device 600 is enabled to communicate with other nodes and/or entities in the wireless communication network. The first radio communication device 600 further comprises a memory 602 for storing data. Further, the first radio communication device 600 may comprise a control or processing unit which in turn may be connected to the different units 603, 604, 609. It shall be pointed out that this is merely an illustrative example and the first radio communication device 600 may comprise more, less or other units or modules which execute the functions of the first radio communication device 600 in the same manner as the units illustrated in FIG. 6.

It should be noted that FIG. 6 merely illustrates various functional units in the first radio communication device 600 in a logical sense. The functions in practice may be implemented using any suitable software and hardware means/circuits etc. Thus, the embodiments are generally not limited to the shown structures of the first radio communication device 600 and the functional units. Hence, the previously described exemplary embodiments may be realised in many ways. For example, one embodiment includes a computer-readable medium having instructions stored thereon that are executable by a control or processing unit for executing the method steps in the first radio communication device 600. The instructions executable by the computing system and stored on the computer-readable medium perform the method steps of the first radio communication device 600 as set forth in the claims.

In FIG. 7, the second radio communication device 700 is also illustrated comprising a communication unit 701. Through this unit, the second radio communication device 700 is adapted to communicate with other nodes and/or entities in the wireless communication network. The communication unit 701 may comprise more than one receiving arrangement. For example, the communication unit 701 may be connected to both a wire and an antenna, by means of which the second radio communication device 700 is enabled to communicate with other nodes and/or entities in the wireless communication network. Similarly, the communication unit 701 may comprise more than one transmitting arrangement, which in turn is connected to both a wire and an antenna, by means of which the second radio communication device 700 is enabled to communicate with other nodes and/or entities in the wireless communication network. The second radio communication device 700 further comprises a memory 702 for storing data. Further, the second radio communication device 700 may comprise a control or processing unit which in turn may be connected to the different units 703, 709. It shall be pointed out that this is merely an illustrative example and the second radio communication device 700 may comprise more, less or other units or modules which execute the functions of the second radio communication device 700 in the same manner as the units illustrated in FIG. 7.

It should be noted that FIG. 7 merely illustrates various functional units in the second radio communication device 700 in a logical sense. The functions in practice may be implemented using any suitable software and hardware means/circuits etc. Thus, the embodiments are generally not limited to the shown structures of the second radio communication device 700 and the functional units. Hence, the previously described exemplary embodiments may be realised in many ways. For example, one embodiment includes a computer-readable medium having instructions stored thereon that are executable by a control or processing unit for executing the method steps in the second radio communication device 700. The instructions executable by the computing system and stored on the computer-readable medium perform the method steps of the second radio communication device 700 as set forth in the claims.

Figure 8:
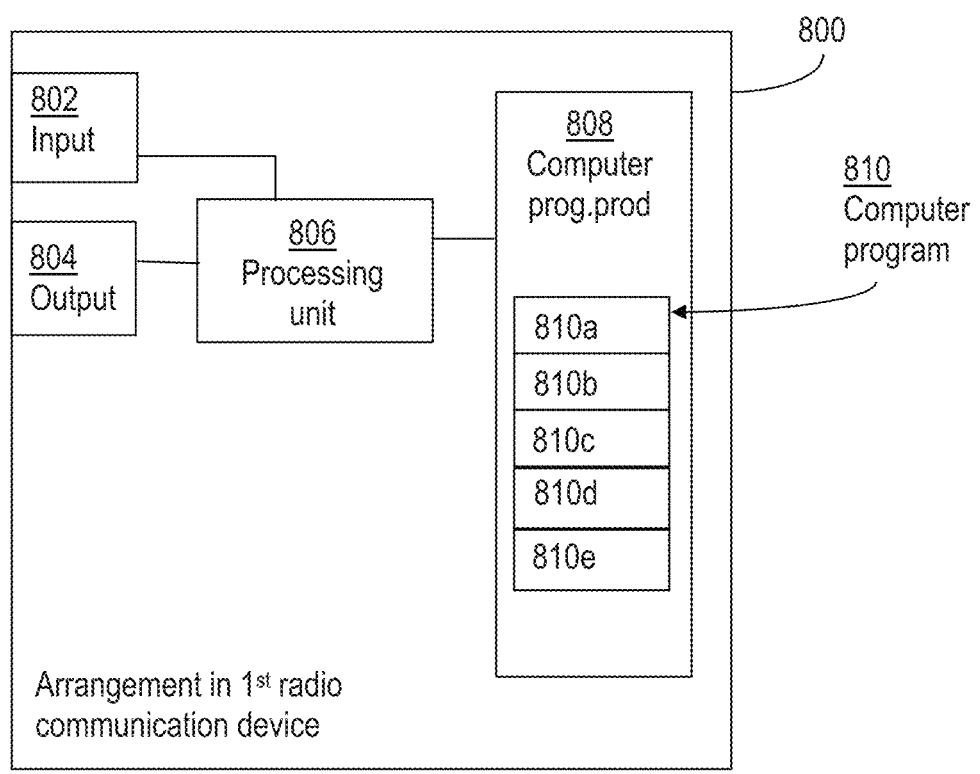
FIG. 8 is a block diagram of an arrangement in a first communication device adapted for communicating with a second communication device according to an exemplifying embodiment.

FIG. 8 schematically shows an embodiment of an arrangement in a first radio communication device 800. Comprised in the arrangement in the first radio communication device 800 are here a processing unit 806, e.g. with a DSP (Digital Signal Processor). The processing unit 806 may be a single unit or a plurality of units to perform different actions of procedures described herein. The arrangement in the first radio communication device 800 may also comprise an input unit 802 for receiving signals from other entities, and an output unit 804 for providing signal(s) to other entities. The input unit and the output unit may be arranged as an integrated entity or as illustrated in the example of FIG. 6, as one or more interfaces 601.

Furthermore, the arrangement in the first radio communication device 800 comprises at least one computer program product 808 in the form of a non-volatile memory, e.g. an Electrically Erasable Programmable Read-Only Memory, EEPROM, a flash memory and a hard drive. The computer program product 808 comprises a computer program 810, which comprises code means, which when executed in the processing unit 806 in the arrangement in the first radio communication device 800 causes the first radio communication device 800 to perform the actions e.g. of the procedure described earlier in conjunction with FIG. 2a.

The computer program 810 may be configured as a computer program code structured in computer program modules 810a-810e. Hence, in an exemplifying embodiment, the code means in the computer program of the arrangement in the first radio communication device 800 comprises a transmitting unit, or module, for transmitting on an unlicensed frequency band, to at least the second radio communication device, an indication of a duration of a guard period, wherein an upcoming data transmission is to be performed to the second radio communication device after the expiration of the guard period; and for during the guard period, sending and/or receiving information to/from at least one other radio communication device, the other communication device being the second radio communication device or a third communication device.

The computer program modules could essentially perform the actions of the flow illustrated in FIG. 2a, to emulate the first radio communication device 600. In other words, when the different computer program modules are executed in the processing unit 806, they may correspond to the unit 603 of FIG. 6.

Figure 9:
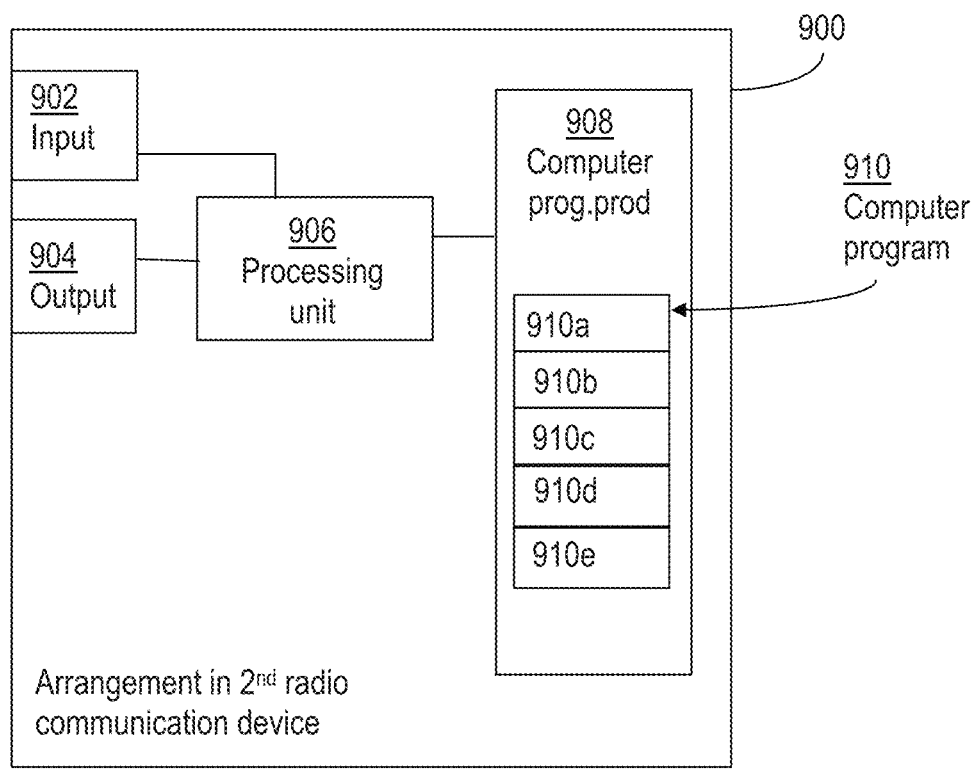
FIG. 9 is a block diagram of an arrangement in a second communication device adapted for communicating with a first communication device according to an exemplifying embodiment.

FIG. 9 schematically shows an embodiment of an arrangement in a second radio communication device 900. Comprised in the arrangement in the second radio communication device 900 are here a processing unit 906, e.g. with a DSP. The processing unit 906 may be a single unit or a plurality of units to perform different actions of procedures described herein. The arrangement in the second radio communication device 900 may also comprise an input unit 902 for receiving signals from other entities, and an output unit 904 for providing signal(s) to other entities. The input unit and the output unit may be arranged as an integrated entity or as illustrated in the example of FIG. 7, as one or more interfaces 701.

Furthermore, the arrangement in the second radio communication device 900 comprises at least one computer program product 908 in the form of a non-volatile memory, e.g. an EEPROM, a flash memory and a hard drive. The computer program product 908 comprises a computer program 910, which comprises code means, which when executed in the processing unit 906 in the arrangement in the second radio communication device 900 causes the arrangement in the second radio communication device 900 to perform the actions e.g. of the procedure described earlier in conjunction with FIG. 3a.

The computer program 910 may be configured as a computer program code structured in computer program modules 910a-910e. Hence, in an exemplifying embodiment, the code means in the computer program of the arrangement in the second radio communication device 900 comprises a receiving unit, or module, for receiving, from the first radio communication device, an indication of a duration of a guard period, wherein an upcoming data transmission is to be received after the expiration of the guard period; and for during the guard period, sending and/or receiving information to/from the first radio communication device.

The computer program modules could essentially perform the actions of the flow illustrated in FIG. 3a, to emulate the second radio communication device 700. In other words, when the different computer program modules are executed in the processing unit 906, they may correspond to the unit 703 of FIG. 7.

Although the code means in the respective embodiments disclosed above in conjunction with FIGS. 6 and 7 may be implemented as computer program modules which when executed in the respective processing unit causes the first and the second radio communication device respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-access memory, RAM, Read-Only Memory, ROM, or an EEPROM, and the computer program modules described above could in alternative embodiments be distributed on different computer program products in the form of memories within the first and the second radio communication device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Figure 10A:
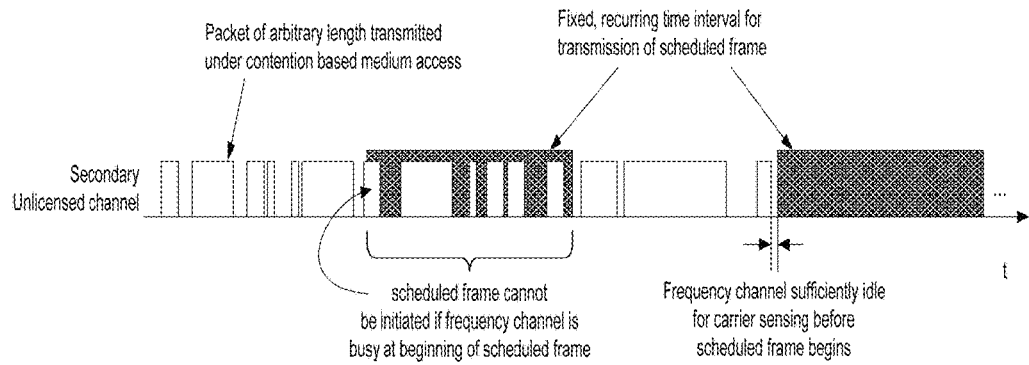
FIG. 10a is an exemplifying illustration of contention, on an unlicensed frequency band, for resources, wherein the resources are busy.
Figure 10B:
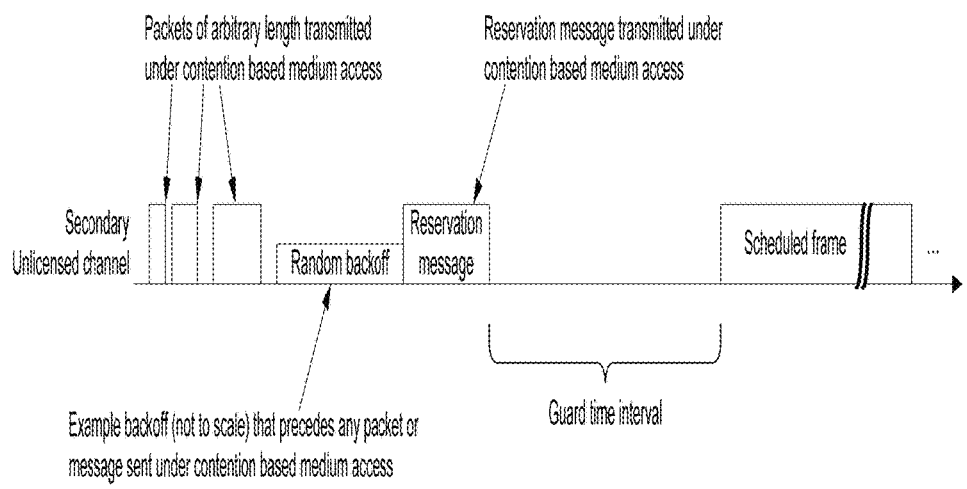
FIG. 10b is an exemplifying illustration of contention, on an unlicensed frequency band, for resources, wherein the contention is successful and followed by a guard interval.
Figure 10C:
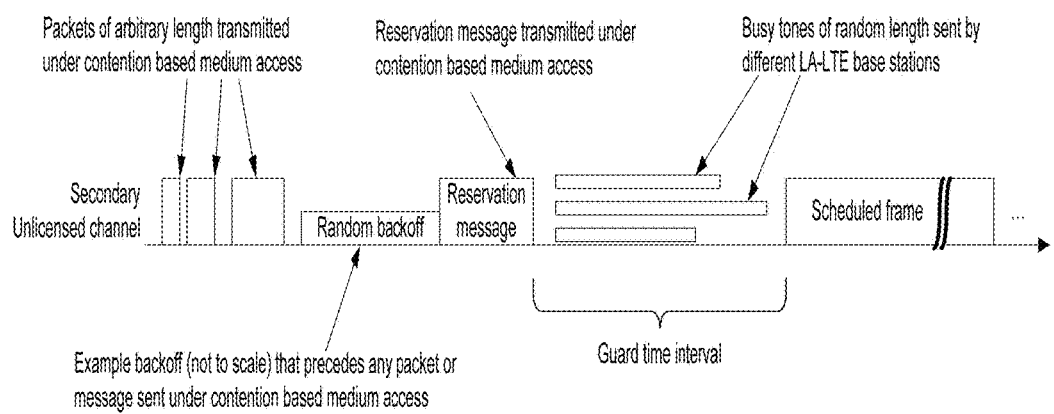
FIG. 10c is an exemplifying illustration of contention, on an unlicensed frequency band, for resources, wherein the contention is successful and followed by a guard interval, wherein radio communication devices contend for the upcoming data transmission, or scheduled frame.

FIGS. 10*a*, 10*b* and 10*c* are exemplifying illustrations of contention for resources of the unlicensed frequency band. These will now be briefly described with an example of the unlicensed frequency band applying the IEEE 802.11 WLAN protocol.

Many devices that operate in the unlicensed frequency channel implement the IEEE 802.11 WLAN protocol. IEEE 802.11 defines a distributed, contention based medium access scheme. Devices perform channel sensing and random access before they transmit packets of arbitrary size. Because of this random nature IEEE 802.11 compliant devices can access the wireless medium at any time. Furthermore, IEEE 802.11 compliant devices do not stop to transmit or foreshore their transmission in favor of scheduled communication systems. IEEE 802.11 compliant devices are not aware of these schedules and thus chances might be low that a scheduled communication system finds the wireless medium idle shortly before its frame transmission begins.

IEEE 802.11 compliant devices implement physical and virtual carrier sensing. A special reservation frame (e.g. RTS or CTS) may signal the impending use of the wireless medium. The NAV contained within the reservation message signals receiving IEEE 802.11 devices that these devices shall refrain from accessing the wireless medium for the time specified in the NAV.

A radio communication device of the wireless communication system using scheduled medium access senses the wireless medium on the secondary frequency channel before the beginning of its scheduled frame. Once the scheduled communication system, e.g. en LTE network, successfully performed a random medium access (e.g. random backoff) the system, by means of the above described first radio communication device, transmits a reservation message that sets the NAV at surrounding IEEE 802.11 compliant devices. The reservation message contains a hint indicating that this reservation message is sent by a communication system applying a scheduled medium access scheme. An example reservation message is the IEEE 802.11 CTS. Instead of addressing the CTS to a dedicated IEEE 802.11 device, the hint may be implemented by addressing the CTS frame to a special, reserved MAC address that could be uniquely reserved for this purpose so that all surrounding IEEE 802.11 compliant devices may receive the CTS frame.

The period after the transmission of the reservation message until the beginning of the scheduled frame is denoted as guard time interval. The guard time interval can be used by communication systems applying scheduled medium access scheme as described above with regards to the first and the second radio communication device.

FIG. 10*a* illustrates an example wherein the first radio communication devices senses the unlicensed frequency band, or a channel or resource thereof, and concludes that the channel is busy and thus waits for a period of time before attempting to sense the unlicensed frequency band again.

FIG. 10*b* example wherein the first radio communication devices senses the unlicensed frequency band, or a channel or resource thereof, and concludes the channel is free. The first radio communication device then performs a backoff of a random duration in time before transmitting the reservation message so that the guard period begins.

The wireless communication system using scheduled medium access senses the wireless medium on the secondary frequency channel before the beginning of its scheduled frame. Once the scheduled communication system successfully performed a random medium access (e.g. random backoff) the system transmits a reservation message that sets the NAV at surrounding IEEE 802.11 compliant devices. The period after the transmission of the reservation message until the beginning of the scheduled frame is denoted as guard time interval.

Neighbouring communication systems, or neighbouring radio communication devices, using the same scheduled medium access technology receive the reservation message that is destined to the special MAC address. Reception of a reservation message destined to this special MAC address indicates that the wireless medium is cleared from competing IEEE 802.11 compliant devices. Neighbouring radio communication devices may then compete on the right to exclusively use the upcoming period for their scheduled frame. The arbitration mechanism to elect a single base station as the owner of the following scheduled frame period may incorporate a busy tone mechanism, as illustrated in FIG. 10*c*. The figure shows a busy tone concept where radio communication devices such as e.g. RBSs transmit busy tones of random length. Once an RNS's randomly selected busy tone duration expired, the RBS turns to receiving mode. If the RBS receives a busy tone the RBS defers and cannot use the upcoming scheduled frame period. An RBS that does not receive any signal after it ended its busy tone transmission and turned into the receiving state considers itself as the elected owner of the upcoming scheduled frame period. This RBS may proceed to transmit its scheduled frame once the guard period has expired.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, performed by a first radio communication device, for communicating with a second radio communication device, the method comprising:
  transmitting, on an unlicensed frequency band and to at least the second radio communication device, an indication of a duration of a guard period, wherein an upcoming data transmission is to be performed to the second radio communication device after the expiration of the guard period;
  during the guard period, sending and/or receiving information to/from at least one other radio communication device, the other communication device being the second radio communication device or a third communication device;
  contending with other radio communication devices, not being the second radio communication device, for the upcoming data transmission to the second radio communication device after the expiration of the guard period.

2. The method of claim 1, wherein the sending and/or receiving information to/from at least the one other radio communication device comprises:
  sending, to the second radio communication device, a request for Sounding Reference Symbols (SRSs);
  receiving SRSs from the second radio communication device.

3. The method of claim 1, wherein the sending and/or receiving information to/from at least the one other radio communication device comprises transmitting control information to at least the second radio communication device.

4. The method of claim 3:
  wherein the first and the second radio communication devices are comprised in a communication network operating on a licensed frequency band;
  wherein the transmitting control information to at least the second radio communication device comprises transmitting, on the unlicensed frequency band a Physical Downlink Control Channel (PDCCH) associated with licensed frequency band to the second radio communication device.

5. The method of claim 3, wherein the transmitting control information to the second radio communication device comprises transmitting reference symbols to the second radio communication device.

6. The method of claim 5, wherein the reference symbols are:
  Positioning Reference Symbols (PRSs) and Cell-specific Reference Symbols (CRSs);
  Cell State Information Reference Symbols (CSI-RSs);
  a last CRS of an Long Term Evolution (LTE) subframe and a DeModulation Reference Symbol, DM-RS; or
  CRSs transmitted in a first Orthogonal Frequency Diversity Multiplexing (OFDM) symbol.

7. The method of claim 1:
  wherein data to be transmitted in a first subframe of the upcoming data transmission is transmitted also during the guard period so that a last Orthogonal Frequency Diversity Multiplexing (OFDM) symbol before the start of the first subframe of the data transmission carries the same information as the last OFDM symbol of the first subframe;
  wherein the last OFDM symbol before the start of the first subframe of the data transmission comprises both data and reference symbols.

8. The method of claim 1, wherein a transmission format used during the guard period is compliant with the unlicensed frequency band.

9. The method of claim 1, further comprising, prior to transmitting the indication of the duration of the guard period:
  sensing the unlicensed frequency band;
  in response to sensing that the unlicensed frequency band is free, backing off for a random length of time before transmitting the indication of the duration of the guard period.

10. The method of claim 1, wherein the contending with other radio communication devices for the upcoming data transmission after the expiration of the guard period comprises:
  transmitting a busy tone during a time period of random length;
  switching to receiving mode;
  in response to the first communication device not receiving a busy tone from another radio communication device, transmitting data to the second radio communication device during the data transmission after the expiration of the guard period.

11. A method, performed by a second radio communication device, for communicating with a first radio communication device, the method comprising:
  receiving, from the first radio communication device, an indication of a duration of a guard period, wherein an upcoming data transmission is to be received after the expiration of the guard period;
  during the guard period, sending and/or receiving information to/from the first radio communication device;
  refraining from contending with the first radio communication device after the expiration of the guard period to receive the upcoming data transmission.

12. The method of claim 11, wherein the sent and/or received information comprises control information.

13. The method of claim 11, wherein the sending and/or receiving information comprises:
  receiving a request from the first radio communication device to send Sounding Reference Symbols (SRSs) to the first radio communication device;
  transmitting SRSs to the first radio communication device.

14. A first radio communication device adapted to communicate with a second radio communication device, the first radio communication device comprising:
  a processor and memory;
  wherein the memory comprises instructions which, when executed by the processor, cause the first radio communication device to:
    transmit, on an unlicensed frequency band and to at least the second radio communication device, an indication of a duration of a guard period, wherein an upcoming data transmission is to be performed to the second radio communication device after the expiration of the guard period;
during the guard period, send and/or receive information to/from at least one other radio communication device, the other communication device being the second radio communication device or a third communication device;
contend with other radio communication devices, not being the second radio communication device, for the upcoming data transmission to the second radio communication device after the expiration of the guard period.

15. The first radio communication device of claim 14, wherein the contending with other radio communication devices for the upcoming data transmission after the expiration of the guard period comprises:
transmitting a busy tone during a time period of random length;
switching to receiving mode; and
in response to the first communication device not receiving a busy tone from another radio communication device, transmitting data to the second radio communication device during the data transmission after the expiration of the guard period.

16. The first radio communication device of claim 14, wherein the memory further comprises instructions which, when executed by the processor, cause the first radio communication device to:
send, to the second radio communication device, a request for Sounding Reference Symbols (SRSs); and
receive SRSs from the second radio communication device.

17. The first radio communication device of any of claim 14, wherein the memory further comprises instructions which, when executed by the processor, cause the first radio communication device to transmit control information to at least the second radio communication device.

18. The first radio communication device of claim 17:
wherein the first and the second radio communication devices are comprised in a communication network operating on a licensed frequency band;
wherein the memory further comprises instructions which, when executed by the processor, cause the first radio communication device to transmit, on the unlicensed frequency band, a Physical Downlink Control Channel (PDCCH) associated with licensed frequency band to the second radio communication device.

19. The first radio communication device of claim 17, wherein the memory further comprises instructions which, when executed by the processor, cause the first radio communication device to transmit reference symbols to the second radio communication device.

20. The first radio communication device of claim 19, wherein the reference symbols are:
Positioning Reference Symbols (PRSs) and Cell-specific Reference Symbols (CRSs);
Cell State Information Reference Symbols (CSI-RSs);
a last CRS of an Long Term Evolution (LTE) subframe and a DeModulation Reference Symbol (DM-RS); or
CRSs transmitted in a first Orthogonal Frequency Diversity Multiplexing (OFDM) symbol.

21. The first radio communication device of claim 14:
wherein data to be transmitted in a first subframe of the upcoming data transmission is transmitted also during the guard period so that a last Orthogonal Frequency Diversity Multiplexing (OFDM) symbol before the start of a first subframe of the data transmission carries the same information as a last OFDM symbol of the first subframe;
wherein the last OFDM symbol before the start of the first subframe of the data transmission comprises both data and reference symbols.

22. The first radio communication device of claim 14, wherein a transmission format used during the guard period is compliant with the unlicensed frequency band.

23. The first radio communication device of claim 14, wherein the memory further comprises instructions which, when executed by the processor, cause the first radio communication device to, prior to transmitting the indication of the duration of the guard period, to:
sense the unlicensed frequency band; and
in response to the unlicensed frequency band being sensed as free, back off for a random length of time before transmitting the indication of the duration of the guard period.

24. A second radio communication device adapted for communicating with a first radio communication device, the second radio communication device comprising:
a processor and memory;
wherein the memory comprises instructions which, when executed by the processor, cause the second radio communication device to:
receive, from the first radio communication device, an indication of a duration of a guard period, wherein an upcoming data transmission is to be received after the expiration of the guard period; and
during the guard period, send and/or receive information to/from the first radio communication device;
refrain from contending with the first radio communication device after the expiration of the guard period to receive the upcoming data transmission.

25. The second radio communication device of claim 24, wherein the sent and/or received information comprises control information.

26. The second radio communication device of claim 24, wherein the memory further comprises instructions which, when executed by the processor, cause the second radio communication device to:
receive a request from the first radio communication device to send Sounding Reference Symbols (SRSs) to the first radio communication device;
transmit SRSs to the first radio communication device.

27. A first radio communication device for communicating with a second radio communication device, the first radio communication device comprising:
a transmitting circuit and a receiving circuit configured to:
transmit, on an unlicensed frequency band and to at least the second radio communication device, an indication of a duration of a guard period, wherein an upcoming data transmission is to be performed to the second radio communication device after the expiration of the guard period;
send and/or receive information to/from at least one other radio communication device during the guard period, the other communication device being the second radio communication device or a third communication device;
contend with other radio communication devices, not being the second radio communication device, for the upcoming data transmission to the second radio communication device after the expiration of the guard period.

28. A second radio communication device for communicating with a first radio communication device, the second radio communication device comprising:
a transmitting circuit and a receiving circuit configured to:
receive, from the first radio communication device, an indication of a duration of a guard period, wherein an upcoming data transmission is to be received after the expiration of the guard period;
send and/or receive information to/from the first radio communication device during the guard period;
refrain from contending with the first radio communication device after the expiration of the guard period to receive the upcoming data transmission.

29. A computer program product stored in a non-transitory computer readable medium for controlling a first radio communication device's communications with a second radio communication device, the computer program product comprising software instructions which, when run on one or more processing circuits of the first radio communication device, causes the first radio communication device to:
transmit, on an unlicensed frequency band and to at least the second radio communication device, an indication of a duration of a guard period, wherein an upcoming data transmission is to be performed to the second radio communication device after the expiration of the guard period;
during the guard period, send and/or receive information to/from at least one other radio communication device, the other communication device being the second radio communication device or a third communication device;
contend with other radio communication devices, not being the second radio communication device, for the upcoming data transmission to the second radio communication device after the expiration of the guard period.

30. A computer program product stored in a non-transitory computer readable medium for controlling a second radio communication device's communications with a first radio communication device, the computer program product comprising software instructions which, when run on one or more processing circuits of the second radio communication device, causes the second radio communication device to:
receive, from the first radio communication device, an indication of a duration of a guard period, wherein an upcoming data transmission is to be received after the expiration of the guard period;
during the guard period, send and/or receive information to/from the first radio communication device;
refrain from contending with the first radio communication device after the expiration of the guard period to receive the upcoming data transmission.

* * * * *